United States Patent [19]

Lucas et al.

[11] Patent Number: 5,363,401
[45] Date of Patent: Nov. 8, 1994

[54] MECHANISM FOR EXTRACTING HYBRID (FH/DS) SPREAD SPECTRUM SIGNALS WITHIN MULTI-SIGNAL TYPE ENVIRONMENT

[75] Inventors: Leonard V. Lucas, Palm Bay; Charles L. Zahm, Indialantic; Edward A. Payne, Palm Bay; Carl F. Andren, Indialantic, all of Fla.

[73] Assignee: Harris Corporation, Melbourne, Fla.

[21] Appl. No.: 23,264

[22] Filed: Feb. 25, 1993

[51] Int. Cl.$^5$ ............................................. H04K 1/00
[52] U.S. Cl. ........................................ 375/1; 380/34
[58] Field of Search ............................. 375/1; 380/34

[56] References Cited

U.S. PATENT DOCUMENTS

| | | | |
|---|---|---|---|
| 5,016,255 | 5/1991 | Dixon | 375/1 |
| 5,136,611 | 8/1992 | Kirimoto et al. | 375/1 |
| 5,150,377 | 9/1992 | Vannucci | 375/1 |
| 5,175,744 | 12/1992 | Crespo et al. | 375/1 |
| 5,208,829 | 5/1993 | Soleimani et al. | 375/1 |
| 5,237,586 | 8/1993 | Bottomley | 375/1 |

Primary Examiner—Tod R. Swann
Attorney, Agent, or Firm—Charles E. Wands

[57] ABSTRACT

Identification and extraction of hybrid, frequency-hopped direct sequence pseudo noise (FH/DS), signals from a multiband signal environment is effected by a sequential signal processing technique which examines the distribution of the energy content within a prescribed sub-spectrum window that is iteratively scanned or 'slides' across the overall signal spectrum of interest. Based upon this energy content distribution, in particular the extent to which a sub-spectrum window contains energy that exhibits significant conjugate phase symmetry associated with a direct spread signal, the inventive signal processing technique proceeds to emphasize the spectral composition of components of which hybrid signals are comprised and to deemphasize the spectral composition of signals other than those contained in hybrid signals. Potential hybrid signal candidates whose spectral composition has been emphasized are then selectively combined with the deemphasized signals to isolate and identify the hybrid signals.

24 Claims, 5 Drawing Sheets

MECHANISM FOR EXTRACTING HYBRID (FH/DS) SPREAD SPECTRUM SIGNALS WITHIN MULTI-SIGNAL TYPE ENVIRONMENT

The present invention relates to subject matter developed under U.S. Air Force Contract No. F33615-90-C-1469.

FIELD OF THE INVENTION

The present invention relates in general to communication systems and is particularly directed to a mechanism for detecting and identifying hybrid frequency-hopped, direct sequence pseudo noise (FH/DS) spread spectrum signals from a signal environment that typically contains multiple interfering frequency sources, including AM, FM, PSK, narrowband frequency hopped signals and non-hopped direct spread signals.

BACKGROUND OF THE INVENTION

Because of their low probability of intercept and resistance to jamming, direct sequence pseudo noise (DSPN) and frequency hopping techniques are often used to successfully conduct secure/covert communications. For increased immunity against interception, these two techniques may be combined to produce hybrid spread spectrum (HSS) signals, i.e. those which employ a combination of frequency hopping (FH) and DSPN modulation. Unfortunately, each of these two modulation techniques customarily employs its own signal processing mechanism, that does not readily lend itself to recovery of the other form of modulation, particularly in a multi-signal type environment which may contain a variety of narrowband signals, such as AM, FM, PSK, and narrowband frequency hopping signals, all occurring simultaneously within the same operating frequency spectrum.

More particularly, a conventional mechanism utilized for (narrowband, positive signal-to-noise ratio) frequency hop detection is the channelized radiometer, containing a filter bank to isolate each of the frequencies to which the FH source may hop, with each filter being tuned to a respectively different instantaneous bandwidth or channel. Interception of a (wideband, negative signal-to-noise ratio) DSPN signal, on the other hand, normally entails the use of non-linear signal processing, such as squaring or convolution, in order to collapse the wideband spectrum down to a readily identifiable spectral line. Because of the low concentrated energy content (negative S/N) of the spread signal, the integration time required to process detected energy can be expected to be considerably longer than a frequency hop dwell time, so that recovery of an HSS signal may not be successful using conventional spread spectrum processing. Of course, complicating the problem is the fact that the signal environment being monitored for the presence of hybrid signals is not particularly 'clean'. It can be expected to be cluttered with a large number of signals having a variety of modulation formats, which effectively mask the presence of hybrid signals.

SUMMARY OF THE INVENTION

In accordance with the present invention, the problem of identification and extraction of hybrid FH/DS signals from a multiband signal environment, that contains both wideband and narrowband signals, is successfully addressed by a sequential signal processing technique which examines the distribution of the energy content within a prescribed sub-spectrum window that is iteratively scanned or 'slides' across the overall signal spectrum of interest. Based upon this energy content distribution, in particular the extent to which a sub-spectrum window contains energy that exhibits significant frequency domain conjugate phase symmetry associated with a direct spread signal, the inventive signal processing technique proceeds to emphasize the spectral composition of components of which hybrid signals are comprised and to deemphasize the spectral composition of signals other than those contained in hybrid signals. Potential hybrid signal candidates whose spectral composition has been emphasized are then selectively combined with the deemphasized signals to isolate and identify the hybrid signals.

Emphasis of the spectral composition of (wideband spread) signals having conjugate phase symmetry associated with the spread spectrum modulation characteristics of hybrid signals, and deemphasis of unwanted, interfering narrowband signals is effected by means of a signal processing analyzer, which is operative to cross-multiply and sum the cross-multiply products of signals present in a prescribed frequency range displaced from and located above the center frequency of a respective frequency window by signals present in a prescribed frequency range displaced from and located below the window center frequency. This signal processing analyzer, which functions as an emphasis, deemphasis mechanism, is also operative to self-multiply (i.e. square) signals at the window center frequency.

The effect of these two multiply operations is to emphasize signals whose energy distribution possesses conjugate phase symmetry about the window center frequency and deemphasize signals whose energy distribution possesses conjugate antisymmetry about the window center frequency. Narrowband signals which coincide with the center frequency are also emphasized (by the squaring operation). However, they are removed from consideration as potential hybrid signal candidates by observation that they exhibit no significant spectral energy of a balanced nature 'outside' the center frequency. Instead their substantial energy is concentrated in the vicinity of the center frequency of the window.

The mechanism for distinguishing interfering narrowband 'spikes' from emphasized (collapsed) direct spread (potentially hybrid) spikes involves comparing the magnitude of the self-multiplied or squared signals at the window center frequency with the magnitude of the sum of the products of signals present in the ranges above and below the center frequency. The self-multiplied signals are identified as being narrowband signals in accordance with whether or not a ratio of the two quantities exceeds a prescribed threshold.

To distinguish stationary or non-hopped spread signals from FH/DS signals, the duration of the emphasized spread signals is measured. Those spread signals having a duration greater that a prescribed duration (associated with the dwell time of frequency-hopped signals) are considered to be effectively steady (non-hopped) spread signals and are removed from consideration as hybrid signals. What remains after applying the signal processing operator of the present invention to the overall spectrum bandwidth of interest is a frequency domain distribution of signal energy values in which emphasized true hybrid signals rise well above the noise floor of the spectrum distribution and are thereby readily identifiable. The energy content this signal distribution is further collapsed to sharply defined hybrid carrier spectral lines, by subjecting the processed signals to sidelobe suppression, thereby removing additional sidelobes that result from the processing of offset hybrid signals, which exhibit some degree of conjugate phase symmetry of energy distribution.

DETAILED DESCRIPTION

Figure 1:
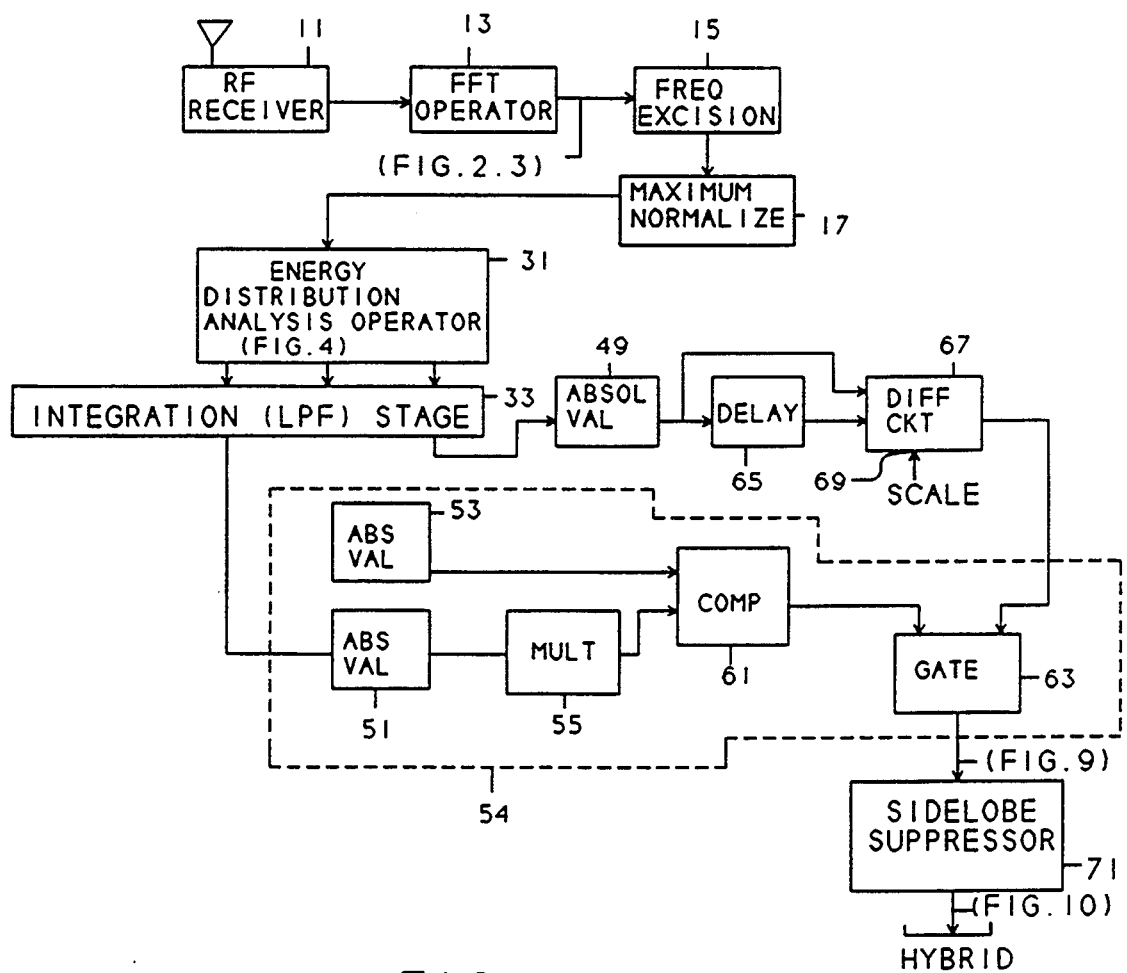
FIG. 1 is a diagrammatic illustration of a signal processing system in accordance with an embodiment of the present invention for identifying hybrid signals within a multiple and diverse signal type-containing environment.

Before describing in detail the inventive mechanism for processing and identifying FH/DS signals that may be present within a multi-signal type environment, it should be observed that the present invention resides primarily in a novel structural combination of conventional communication and signal processing circuits and components, the timing and control of which is supervised by a programmed control processor, and not in the particular detailed configurations thereof. In addition, complex signal processing operations which involve high speed, high data density signal flow may be executed in either special purpose hardware or by means of dedicated software functionality incorporated into the control processor. Consequently, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

As pointed out briefly above, the present invention is directed to a mechanism for successfully extracting, from a relatively 'busy' signal environment, FH/DS signals, which contain both frequency hopping (FH) and direct sequence pseudo-noise (DSPN) modulation in order to substantially increase the system's immunity against interception. By 'busy' is meant that spectrum being monitored can be expected to contain a variety of narrowband signals, such as AM, FM, PSK and narrowband frequency hopping signals, as well as stationary spread signals, so that the signal environment being monitored for the presence of hybrid signals is not relatively 'clean' but, instead, effectively masks the presence of one or more hybrid signals that are effectively 'buried in the noise'.

FIG. 1 is a diagrammatic illustration of a signal processing system in accordance with an embodiment of the present invention for successfully identifying hybrid signals within such a multiple and diverse signal-containing environment. The front end of the system comprises a broadband receiver 11, which monitors the communication band of interest. For purposes of providing an illustrative, non-limitative example, the signal bandwidth is a 12.8 MHz wide spectrum that may be channelized into 512 frequency bins each 25 Khz wide. The 25 KHz width of an individual bin corresponds to a nominal frequency hop spacing. The spread width of signals has been chosen to be 100 kilochips, which corresponds to four chips per FFT block of an FFT operator referred to below.

Figure 2:
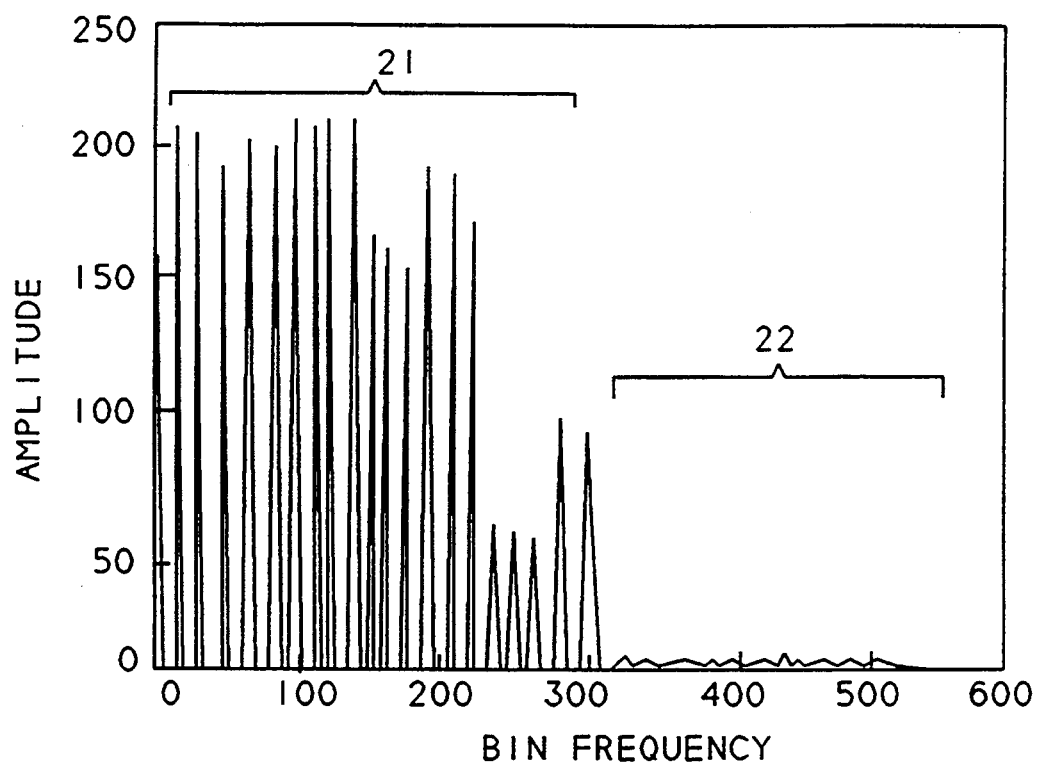
FIG. 2 is an amplitude vs. frequency plot of the output of FFT operator of the system of FIG. 1.

The output of receiver 11 is represented by the amplitude vs. frequency plot of FIG. 2. In the 'busy' signal environment of the illustrated example, there are a plurality of narrowband interfering signals in the left side or lower portion 21 of the frequency spectrum. Typically these may be comprised of narrowband AM, FM, PSK, and offset variations of these signals. The upper portion 22 of the frequency spectrum contains a plurality (in the present example eight) spread signals operating at levels slightly above and below the noise floor, which are not immediately identifiable at the either the input or the output of a fast Fourier transform (FFT) operator 13 to which the output of receiver 11 is coupled. FFT operator 13 functions in a conventional manner to produce a plurality of digital values respectively representative of the energy detected within a plurality of adjacent frequency bins that make up the overall bandwidth being monitored (12.8 MHz in the present example).

Figure 3:
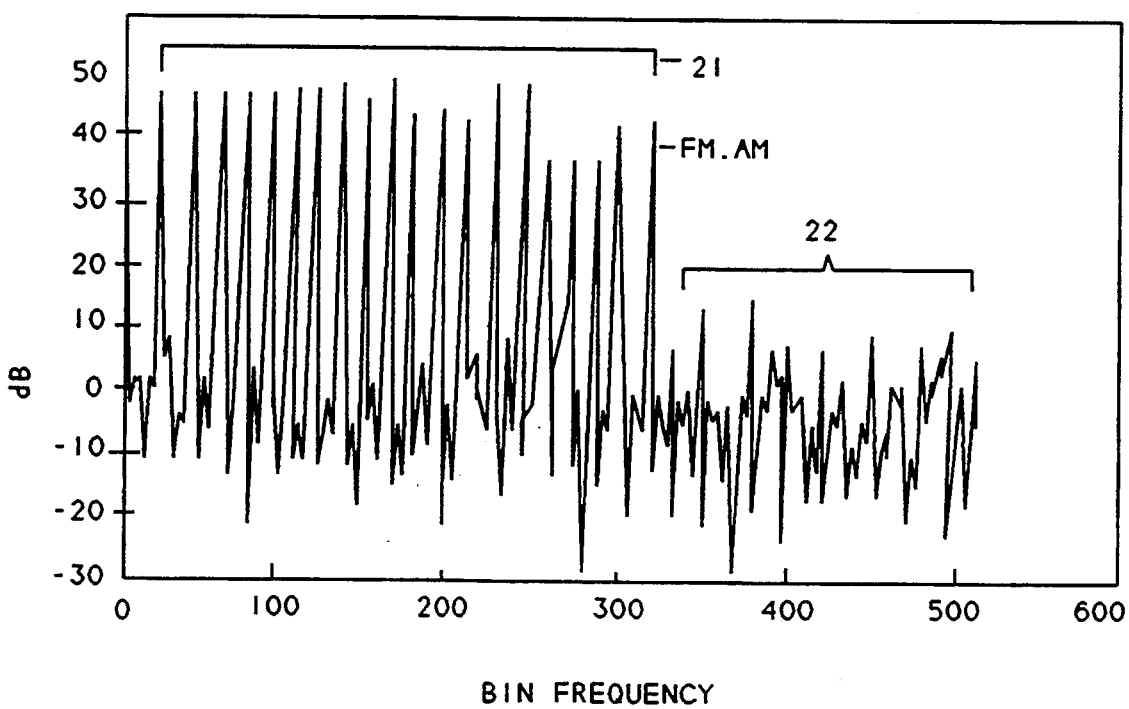
FIG. 3 is a log plot of the output of FFT operator of the system of FIG. 1.

FIG. 3 is a log plot of the energy distribution of FIG. 2, as output by FFT operator 13. Narrowband signals in the left hand portion 21 are shown as having a 45 dB level relative to the noise floor (0 dB). The spread signals which are located in the upper portion 22 of the spectrum are effectively hidden in the noise and not readily identifiable in FIG. 3. As will be described below, the present invention operates so as to suppress the narrowband signals and emphasize the currently non-identifiable FH/DS signals.

In accordance with the present invention the 512 output samples from FFT operator 13 will be processed in groups or windows of plural (e.g. seven) FFT output samples per window. Namely, for an exemplary window bandwidth of seven frequency bins, each window has a bandwidth of 175 KHz, which is stepwise displaced or slides across the 512 sample spectrum, in increments of one bin or 25 KHz per step. Thus, an arbitrary frequency window $Fw_i$ centered at a bin frequency value of 255 will encompass bin frequency values of 252-258. The next incremental frequency window $FW_{i+1}$ will be centered at a bin frequency value of 256 and encompass bin frequency values of 253-259.

The output of FFT operator 13 is initially coupled to an a priori frequency excisor 15, which preliminarily removes from the FFT output selected frequencies known to be frequencies other than potential hybrid signals of interest, so as to facilitate computational processing. Typical examples of such signals are radio station carrier signals. For this purpose, a priori frequency excisor 15 contains a 'to-be-excised' frequency RAM into which code identifications of the frequencies to be removed prior to processing are loaded. The frequency bin codes of the FFT operator 13 are used to address the RAM, the contents of which selectively gate the FFT frequencies from operator 13 for further processing.

As a further step preliminary to the signal emphasis, deemphasis operation, the FFT samples are applied to a maximum normalization operator 17, which takes each window set of (seven in the present example) FFT samples to be processed and normalizes the magnitudes of the FFT samples in the window based upon the maximum magnitude within the set of seven of that window. This maximum normalization operation limits the magnitude of the largest energy sample value within the window to a value no greater than a given threshold and suppresses large magnitude signals in a manner similar to an AGC operation.

Figure 4:
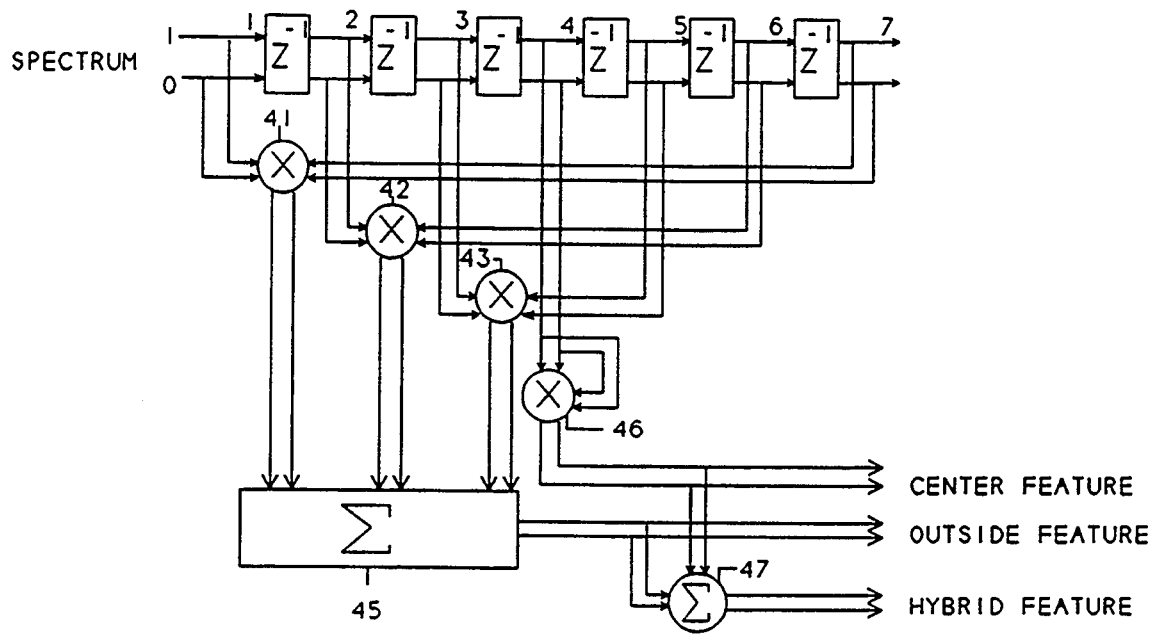
FIG. 4 diagrammatically shows the components of energy distribution analysis operator of the system of FIG. 1.

The maximum-normalized frequency sample values are next applied to the fundamental signal processing operator employed by the present invention, specifically an energy distribution analysis operator 31, the components of which are diagrammatically shown in FIG. 4, to be described. Energy distribution analysis operator 31 examines the distribution of the signal energy within a respective frequency window FW as it is iteratively scanned or 'slides' across the overall signal spectrum (a 12.8 MHz spectrum in the present example) represented by the 512 normalized output samples of FFT operator 13. Energy distribution analysis operator 31 processes the spectral contents of a respective window FW so as to emphasize the extent to which the energy within the window contains significant frequency domain conjugate phase symmetry associated with a direct spread signal, and so as to deemphasize sample values of (narrowband) signals that do not possess conjugate phase symmetry.

For this purpose, as shown in FIG. 4, energy distribution analysis operator 31 may comprise a multistage shift register 41, the number of stages ($Z^{-1}$) of which corresponds to one less than the number of frequency bins in the window (seven in the present example). Each sample value at an input/output of a shift register stage ($Z^{-1}$) is the FFT sample value for one of the (seven) frequency bins of the window being analyzed. To determine the conjugate phase symmetry of the energy distribution associated with a direct spread signal within the window, FFT sample values in the upper portion of the window are multiplied by FFT sample values in the lower portion of the window.

This cross multiply operation is achieved by means of a set of multipliers 41, 42, 43 which respectively cross-multiply the first and seventh FFT samples, the second and sixth FFT samples, and the third and fifth FFT samples. The products are summed in adder 45, the sum output of which represents the energy contribution of those bins within window FW which are 'outside' or displaced from its center frequency fc. For a direct spread signal having conjugate phase symmetry about its center frequency fc, as represented by the energy distribution frequency plot example of FIG. 5, it can be seen that the cross-multiply and sum operation will produce an output value corresponding to a substantially emphasized spectral line at the center frequency of the window.

Figure 7:
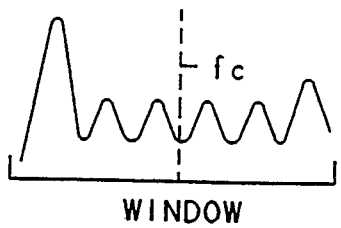
FIGS. 6 and 7 are respective energy distribution frequency plot examples of signals not having conjugate phase symmetry about center frequency fc, namely conjugate antisymmetry.
Figure 6:
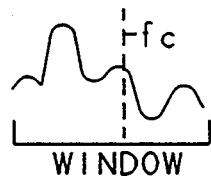

On the other hand, for signals not having conjugate phase symmetry about center frequency fc, namely conjugate antisymmetry, as represented by the energy distribution frequency plot examples of FIGS. 6 and 7, it can be seen that the cross-multiply operation will multiply a substantial energy magnitude value by a very low value or values of opposite polarity. When these products are then summed together the effect is a reduced or deemphasized output.

The signal emphasis, deemphasis operator 31 of FIG. 4 is also operative to self-multiply (i.e. square) signals at the window center frequency by means of squaring stage 46, the product output of which represents the energy contribution of the 'center' bin of the window, i.e. at center frequency fc. A narrowband signal centered at the window center frequency fc will yield a substantial output from multiplier 46, but a very low output from adder 45. The outputs of adder 45 and multiplier 46 are summed in adder 47 to produce an output which represents a complete picture of conjugate phase symmetry energy distribution within the window, namely an emphasized spread and therefore potential FH/DS signal. Thus, the effect of the outside bin cross-multiply and summation operations is to emphasize signals whose energy distribution is associated with spread signals, having conjugate phase symmetry about the window's center frequency fc, and to deemphasize signals whose energy distribution possesses conjugate antisymmetry about the bin center frequency.

The respective outputs of adder 45, multiplier 46 and adder 47 within the signal emphasis, deemphasis operator 31 of FIG. 4 are applied to an integration stage 33, which may be comprised of a set of low pass filters that are respectively coupled to the outputs of each of adder 45, multiplier 46 and adder 47. Integrating stage serves to reduce noise variance in order to facilitate signal detection downstream.

Figure 8:
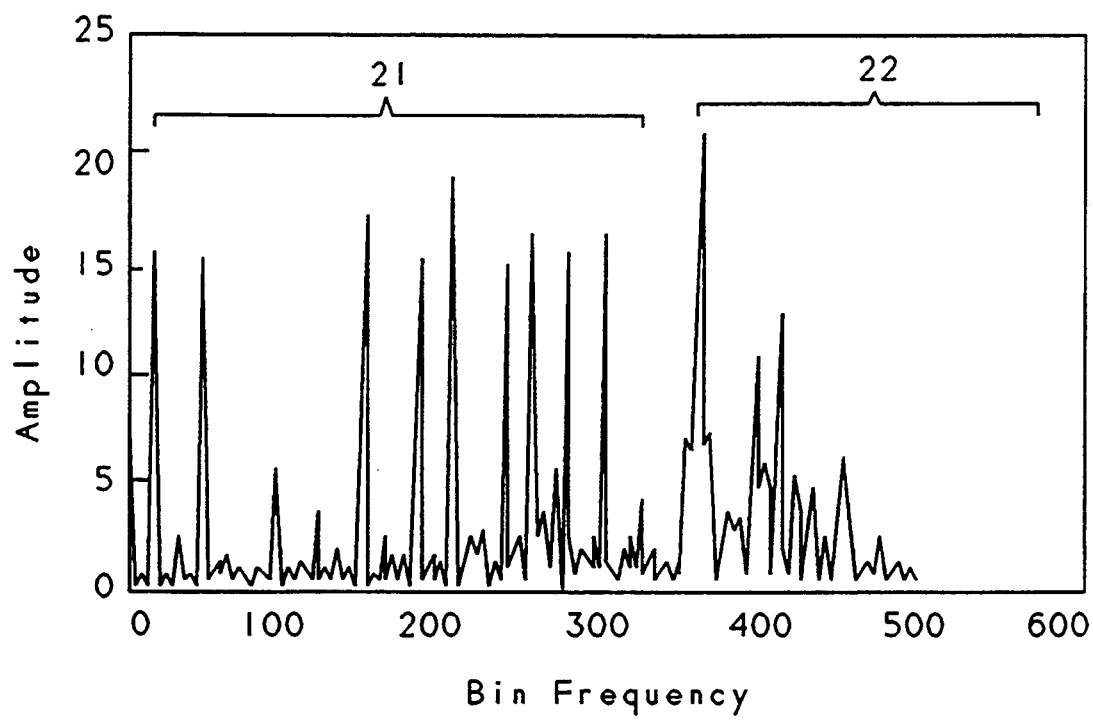
FIG. 8 shows an amplitude vs. frequency plot of the effect of the operations performed by signal emphasis, deemphasis operator of the system of FIG. 1.

FIG. 8 shows an amplitude vs. frequency plot of the effect of the operations performed by signal emphasis, deemphasis operator 31. As shown in the upper portion 22 of the spectrum, the energy in spread signals, previously buried and undetectable in the plots of FIGS. 2 and 3, now manifests itself as clearly distinguishable peaks. Still, unwanted narrowband signals are also emphasized (by the squaring operation of multiplier 46) and remain in the lower portion 21 of the spectrum.

In order to excise narrowband signals from the signals output by signal emphasis, deemphasis operator 31 the magnitudes of the self-multiplied or squared signals are compared with the magnitude of the sum of the product of 'outside' signals present in the ranges above and below the center frequency. The contents of the window are identified as being narrowband signals in accordance with whether or not a ratio of the magnitude of the squared 'center' bin values to the magnitude of the sum of the product of 'outside' bin values exceeds a prescribed threshold $T_N$.

Referring again to FIG. 1, the 'outside' summation value output by adder 45 and the 'center' value from multiplier 46 are coupled to absolute value units 51 and 53, respectively, within a narrowband excision operator 54. Absolute value units 51 and 53 serve to remove the imaginary components of the complex sample values being processed. The absolute value of the outside value is scaled in a multiplier 55 by a coefficient associated with the threshold $T_N$. The center value and the scaled outside values are then compared with one another in comparator 61.

Figure 5:
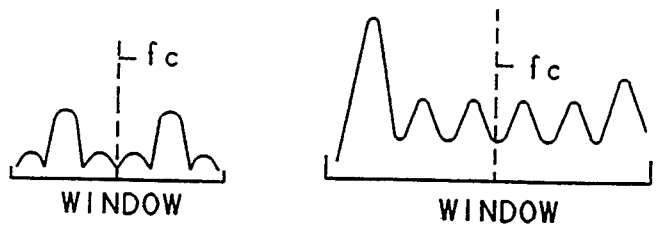
FIG. 5 is an energy distribution frequency plot example for a direct spread signal having conjugate phase symmetry about its center frequency fc.

For a narrowband signal, most of the energy within the window is concentrated in the vicinity of the center frequency. Thus, if the emphasized sample output of operator 31 is associated with a narrowband signal, the output of comparator 61 will go low and disable a downstream gate 63, which is employed to selectively pass only potential hybrid candidates. For a wideband direct spread signal, on the other hand, most of the energy within the window will not be concentrated in the vicinity of the center frequency but is spread across the window, as shown in FIG. 5, referenced previously. In this event, the output of comparator 61 will go high and enable a downstream gate 63 to pass the emphasized sample value.

As pointed out above, the outputs of adder 45 and multiplier 46 are summed in adder 47 in order to produce an output which represents a complete picture of a conjugate phase symmetry energy distribution within the window, namely an emphasized potential hybrid signal. If the signal is indeed a direct spread (potentially an FH/DS) signal, then the narrowband excision operator 54 will pass the emphasized signal through gate 63. If the emphasized signal is associated with a narrowband signal, on the other hand, essentially all of the contribution to the output of adder 47 will be derived from the center bin of the window and narrowband excision operator will disable gate 63.

A third case involves the presence of a stationary, or effectively long term (non-hopped), sample within the window. In this case, the outputs of adder 45 and multiplier 46 will be effectively indistinguishable from those in the case of a hybrid signal. To prevent a stationary spread signal from being output as a prospective hybrid candidate, the energy in the output of adder 47 is monitored to see if it persists for a period of time beyond a prescribed hop dwell time (chosen to be ten milliseconds in the present example). To distinguish steady or non-hopped spread signals from FH/DS signals, the duration of the emphasized spread values output by adder 47 is measured by means of a delay 65. The output of adder 47 is coupled to absolute value unit 49 and to a first input of a difference circuit 67. The output of delay 65 is coupled to a second input of difference circuit 67. Difference circuit 67 has a scaling input 69 through which the magnitude of the delayed absolute value of the output of adder 47 may be scaled. If the output of adder 47 is associated with a stationary spread signal, rather than an FH/DS signal, then, at the expiration of the time-out provided by delay 65, the stationary spread signal energy will still persist and will cancel from the non-delayed value, so that the input to gate 63 will be a very low or near noise level value. On the other hand, in the case of a true hybrid signal, only the delayed signal will be coupled to difference circuit 67. As a result, with gate 63 enabled by the output of comparator 61, the processed true hybrid signal will be allowed to pass to a downstream sidelobe suppressor.

Figure 9:
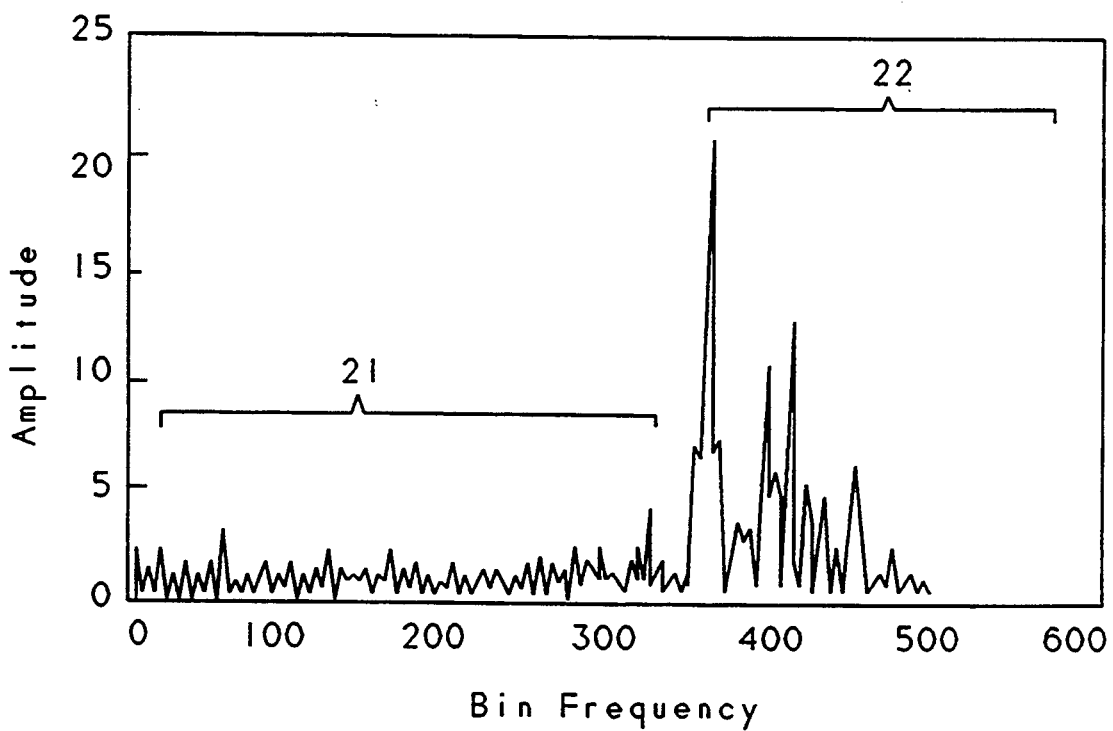
FIG. 9 is an amplitude vs. frequency plot of the output of the output gate of the system of FIG. 1.

Thus what is output by gate 63 is a distribution of emphasized FFT sample values in which emphasized true hybrid signals rise well above the noise floor of the spectrum distribution and are thereby readily identifiable. The output of gate 63 is shown in the amplitude vs. frequency plot of FIG. 9. Note that spread signal energy of FH/DS signals in the upper bin portion 22 of the spectrum plot has been emphasized into a clearly identifiable set of peaks, while the narrowband signals in the lower spectrum region 21 have been excised.

Figure 10:
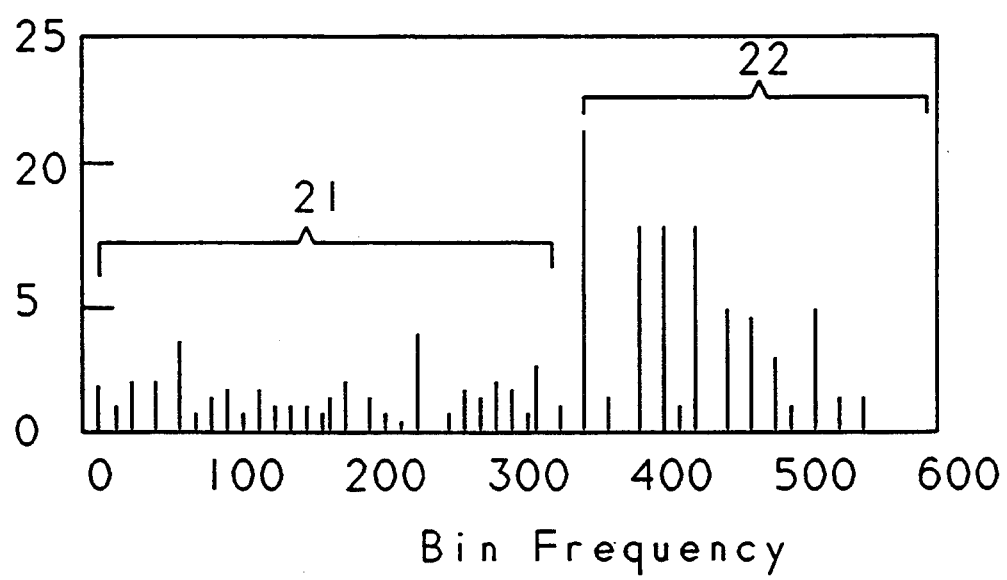
FIG. 10 is an amplitude vs. frequency plot of the output of the sidelobe suppressor of FIG. 1.

The output of gate 63 is coupled to a sidelobe suppressor 71, which is operative to further collapse the energy content in the signal distribution so as to sharply define hybrid carrier spectral lines. As pointed out earlier, this sidelobe suppression operation removes additional sidelobes that result from the processing of offset hybrid signals, which exhibit some degree of conjugate phase symmetry of energy distribution. The resulting amplitude vs. frequency plot of the output of sidelobe suppressor 71 of FIG. 10 clearly delineates a set of spectral lines in the upper portion 22 of the spectrum that represent relatively 'hard' emphasized hybrid signals, which are coupled to a downstream memory (not shown) for subsequent analysis and data recovery.

As will be appreciated from the foregoing description, the problem of identification and extraction of FH/DS signals from a multiband signal environment, that contains both wideband and narrowband signals, is successfully addressed in accordance with the present invention by a sequential signal processing technique which examines the distribution of the energy content within a prescribed subspectrum window that is iteratively scanned or 'slides' across the overall signal spectrum of interest. Based upon this energy content distribution, in particular the extent to which a sub-spectrum window contains energy that exhibits significant conjugate phase symmetry associated with a direct spread signal, the inventive signal processing technique proceeds to emphasize the spectral composition of components of which hybrid signals are comprised and to deemphasize the spectral composition of signals other than those contained in hybrid signals. Potential hybrid signal candidates whose spectral composition has been emphasized are then selectively combined with the deemphasized signals to isolate and identify the hybrid signals.

While we have shown and described an embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of detecting and identifying hybrid, frequency-hopped direct sequence pseudo noise (FH/DS), signals from a potential multi-signal type environment comprising the steps of:

(a) receiving signals from said from said multi-signal type environment;

(b) processing signals received in step (a) in accordance with a signal processing operator which emphasizes the spectral magnitude of said hybrid signals and deemphasizes the spectral magnitude of signals other than said hybrid signals based upon their differing characteristics;

(c) processing Signals received in step (a) in accordance with a signal processing operator which emphasizes the spectoral magnitude of said signals other than hybrid signals and deemphasizes the magnitude of hybrid signals based on their differing characteristics; and (d) selectively combining hybrid signals emphasized in step (b) and said signals other than said hybrid signals emphasized in step (c), so as to extract said hybrid signals.

2. A method according to claim 1, wherein step (b) comprises preliminarily normalizing the signal values received in step (a).

3. A method of detecting and identifying hybrid, frequency-hopped direct sequence pseudo noise (FH/DS), signals from a potential multi-signal type environment comprising the steps of:
(a) receiving signals from said from said multi-signal type environment;
(b) processing signals received in step (a) in accordance with a signal processing operator which emphasizes the spectral composition of said hybrid signals and deemphasizes the spectral composition of signals other than said hybrid signals; and
(c) selectively combining hybrid signals emphasized in step (b) and said signals other than said hybrid signals deemphasized in step (b), so as to extract said hybrid signals; and
wherein step (b) comprises processing signals received in step (a) in accordance with a signal emphasis/deemphasis mechanism, which is operative to process signals present within a prescribed frequency spectrum portion of said potential multi-signal type environment, said frequency spectrum portion having a center frequency and a prescribed frequency range above and below said center frequency, said signal emphasis/deemphasis mechanism processing signals within said prescribed frequency spectrum portion of said potential multi-signal type environment by emphasizing signals whose energy content possesses conjugate phase symmetry about said center frequency and deemphasizing signals whose energy content possesses conjugate antisymmetry about said center frequency.

4. A method according to claim 3, wherein step (b) comprises applying said signal emphasis/deemphasis mechanism to successively adjacent frequency spectrum portions of said potential multi-signal type environment, each frequency spectrum portion having a center frequency and a prescribed frequency range above and below said center frequency, so that within a respective frequency spectrum portion said signal emphasis/deemphasis mechanism emphasizes signals whose energy content possesses conjugate phase symmetry about said center frequency and deemphasizes signals whose energy content possesses conjugate antisymmetry about said center frequency.

5. A method of detecting and identifying hybrid, frequency-hopped direct sequence pseudo noise (FH/DS), signals from a potential multi-signal type environment comprising the steps of:
(a) receiving signals from said from said multi-signal type environment;
(b) processing signals received in step (a) in accordance with a signal processing operator which emphasizes the spectral composition of said hybrid signals and deemphasizes the spectral composition of signals other than said hybrid signals; and
(c) selectively combining hybrid signals emphasized in step (b) and said signals other than said hybrid signals deemphasized in step (b), so as to extract said hybrid signals; and
wherein said signal emphasis/deemphasis mechanism is operative to multiply signals present in a prescribed frequency range above the center frequency of a respective frequency spectrum portion of said potential multi-signal type environment by signals present in a prescribed frequency range below the center frequency of said respective frequency spectrum portion of said potential multi-signal type environment, thereby emphasizing signals whose energy content possesses conjugate phase symmetry about the center frequency of said respective frequency spectrum portion and deemphasizing signals whose energy content possesses conjugate antisymmetry about the center frequency of said respective frequency spectrum portion.

6. A method according to claim 5, wherein said signal emphasis/deemphasis mechanism is operative to identify as potential hybrid signals within a respective frequency spectrum portion those signals whose products have caused an emphasis of the multiplied signals and to reject as non-hybrid signals within said respective frequency spectrum portion those signals whose products have caused a deemphasis of the multiplied signals.

7. A method according to claim 5, wherein said signal emphasis/deemphasis mechanism is operative to self-multiply signals present at the center frequency of said respective frequency spectrum portion of said potential multi-signal type environment, thereby emphasizing signals at the center frequency of said respective frequency spectrum portion of said potential multi-signal type environment.

8. A method according to claim 7, wherein said signal emphasis/deemphasis mechanism is operative to compare the magnitude of self-multiplied signals present at the center frequency of said respective frequency spectrum portion of said potential multi-signal type environment with the magnitude of the product of signals present in said prescribed frequency range above the center frequency of said respective frequency spectrum portion of said potential multi-signal type environment and signals present in said prescribed frequency range below the center frequency of said respective frequency spectrum portion of said potential multi-signal type environment, and wherein step (c) comprises identifying said self-multiplied signals as being signals other than said hybrid signals in accordance with a prescribed relationship between the magnitude of said self-multiplied signals and said product of signals.

9. A method of detecting and identifying hybrid, frequency-hopped direct sequence pseudo noise (FH/DS), signals from a potential multi-signal type environment comprising the steps of:
(a) receiving signals from said from said multi-signal type environment;
(b) processing signals received in step (a) in accordance with a signal processing operator which emphasizes the spectral composition of said hybrid signals and deemphasizes the spectral composition of signals other than said hybrid signals; and
(c) selectively combining hybrid signals emphasized in step (b) and said signals other than said hybrid signals deemphasized in step (b), so as to extract said hybrid signals; and wherein step (b) comprises processing signals received in step (a) in accordance with a signal processing operator which emphasizes the spectral composition of signals having conjugate phase symmetry associated with the spread spectrum modulation characteristics of said hybrid signals, and step (c) comprises selectively monitoring the duration of signals processed by step (b) and identifying as hybrid signals those emphasized signals that have a duration no greater than a prescribed hop dwell time associated with frequency-hopped signals.

10. A method according to claim 9, further comprising the step (d) of performing sidelobe suppression of signals that have been selectively combined in step (c).

11. A method of detecting and identifying hybrid, frequency-hopped direct sequence pseudo noise (FH/DS), signals from a potential multi-signal type environment comprising the steps of:

(a) examining the distribution of the energy content within a prescribed sub-spectrum window that is iteratively scanned across a signal spectrum of interest;

(b) emphasizing the spectral composition of components of which hybrid signals are comprised and deemphasizing the spectral composition of signals other than those contained in hybrid signals in accordance with the extent to which sub-spectrum windows examined in step (a) contain energy that exhibit significant conjugate phase symmetry associated with a direct spread signal;

(c) selectively combining signals emphasized and deemphasized in step (b) so as to isolate and identify hybrid signals.

12. A method according to claim 11, further comprising the step (d) of performing sidelobe suppression of signals that have been selectively combined in step (c).

13. A method according to claim 12, wherein step (b) comprises emphasizing the spectral composition of signals having conjugate phase symmetry associated with the spread spectrum modulation characteristics of hybrid signals, and deemphasizing unwanted, interfering narrowband signals by means of a signal processing analyzer, which is operative to cross-multiply and sum the cross-multiply products of signals present in a prescribed frequency range displaced from and located above the center frequency of a respective frequency window by signals present in a prescribed frequency range displaced from and located below the window center frequency.

14. A method according to claim 13, wherein said signal processing analyzer is operative to self-multiply signals at the window center frequency, and wherein step (c) comprises comparing the magnitude of the self-multiplied signals at the window center frequency with the magnitude of the sum of the products of signals present in the ranges above and below the center frequency, and identifying self-multiplied signals as being narrowband signals in accordance with whether or not a ratio of the sum and the self-multiplied product exceeds a prescribed threshold.

15. A method according to claim 14, wherein step (c) further comprises distinguishing non-hopped spread signals from hybrid signals in accordance with the duration of the emphasized spread signals.

16. A method according to claim 15, further comprising the steps of (d) further collapsing energy content of hybrid signals output by step (b) into sharply defined hybrid carrier spectral lines, by subjecting the hybrid signals output by step (b) to sidelobe suppression.

17. A method according to claim 16, wherein step (b) comprises preliminarily normalizing the signal values contents of each prescribed sub-spectrum window.

18. A system for detecting and identifying hybrid, frequency-hopped direct sequence pseudo noise (FH/DS), signals within signals received from a multi-signal type environment comprising:

a fast Fourier transform operator which is coupled to receive said signals received from said multi-signal type environment and output a plurality of signals respectively representative of the energy content within successive subspectrum portions of prescribed frequency spectrum encompassing said multi-signal type environment;

a signal processing operator which is operative to emphasize the spectral composition of components of which hybrid signals are comprised and deemphasize the spectral composition of signals other than those contained in hybrid signals in accordance with the extent to which said subspectrum windows contain energy that exhibit significant conjugate phase symmetry associated with a direct spread signal; and a hybrid signal identifier which is operative to selectively combine signals emphasized and deemphasized by said signal processing operator so as to isolate and identify hybrid signals within said signals received from said multi-signal type environment.

19. A system according to claim 18, further comprising a sidelobe suppressor coupled to perform sidelobe suppression of signals output by said hybrid signal identifier.

20. A system according to claim 18, wherein said signal processing operator comprises a signal processing analyzer which is operative to emphasize the spectral composition of signals having conjugate phase symmetry associated with the spread spectrum modulation characteristics of hybrid signals, and deemphasize unwanted, interfering narrowband signals by cross-multiplying and summing cross-multiply products of signals present in a prescribed frequency range displaced from and located above the center frequency of a respective frequency window by signals present in a prescribed frequency range displaced from and located below the window center frequency.

21. A system according to claim 20, wherein said signal processing analyzer is operative to self-multiply signals at the window center frequency, and wherein said hybrid signal identifier includes a comparator which is operative to compare the magnitude of the self-multiplied signals at the window center frequency with the magnitude of the sum of the products of signals present in the ranges above and below the center frequency, and to identify self-multiplied signals as being narrowband signals in accordance with whether or not a ratio of the sum and the self-multiplied product exceeds a prescribed threshold.

22. A system according to claim 21, wherein said hybrid signal identifier comprises a timing unit which is operative to distinguish non-hopped spread signals from hybrid signals in accordance with the duration of the emphasized spread signals.

23. A system according to claim 22, further comprising a sidelobe suppressor coupled to perform sidelobe suppression of signals output by said hybrid signal identifier.

24. A system according to claim 22, further comprising a maximum normalizer coupled to the output of said fast Fourier transform operator and is operative to preliminarily normalize the signal values content of each prescribed sub-spectrum window prior to processing thereof by said signal processing operator.

* * * * *